No. 803,371. PATENTED OCT. 31, 1905.
L. TANNER.
INSECT DESTROYER.
APPLICATION FILED MAR. 15, 1905.
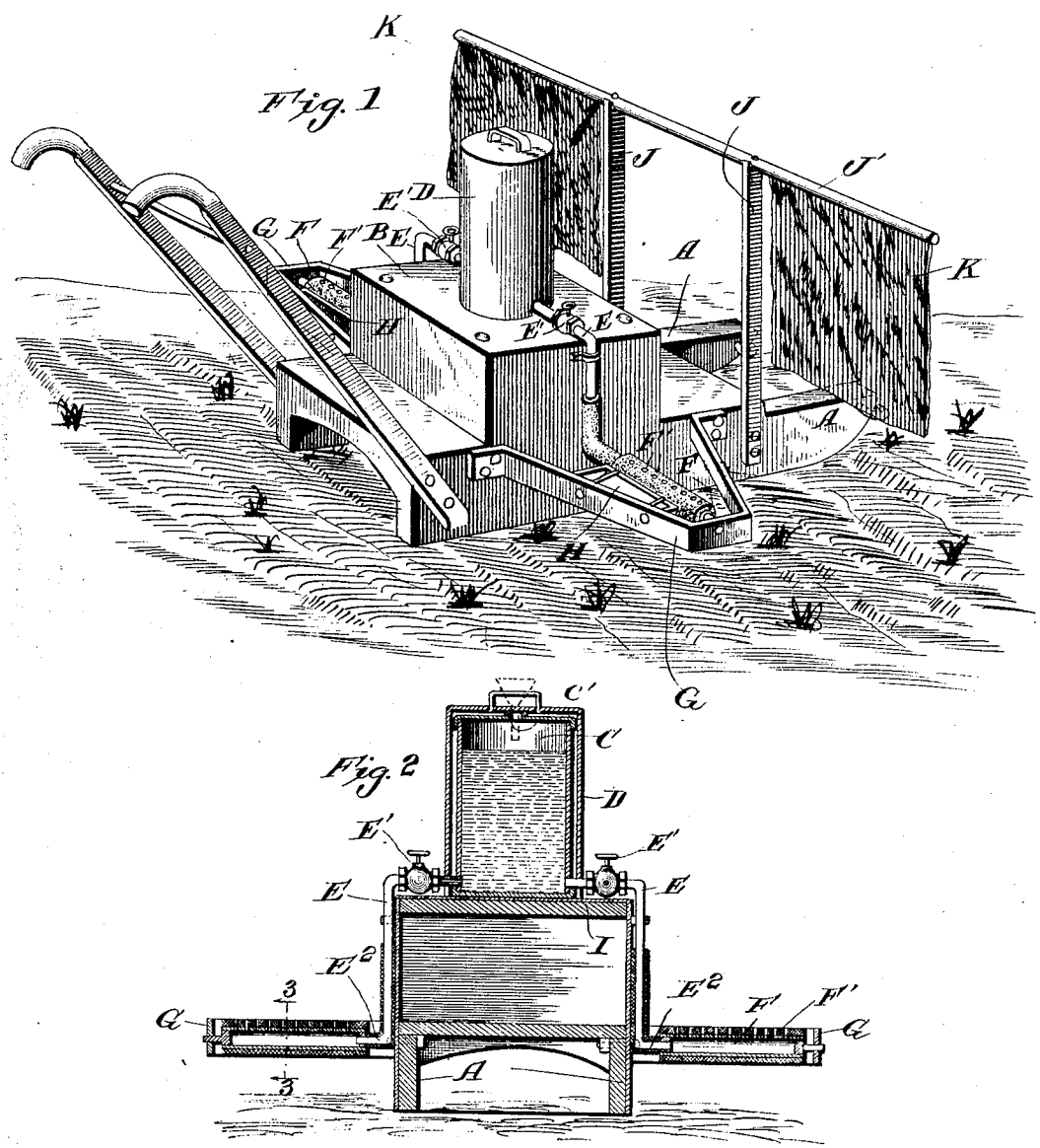
WITNESSES:
INVENTOR
Linn Tanner
BY Munn & Co.
ATTORNEYS

UNITED STATES PATENT OFFICE.

LINN TANNER, OF CHENEYVILLE, LOUISIANA, ASSIGNOR OF ONE-FOURTH TO EDGAR H. McCORMICK, OF ALEXANDRIA, LOUISIANA.

INSECT-DESTROYER.

No. 803,371.        Specification of Letters Patent.        Patented Oct. 31, 1905.

Application filed March 15, 1905. Serial No. 250,208.

*To all whom it may concern:*

Be it known that I, LINN TANNER, a citizen of the United States, and a resident of Cheneyville, in the parish of Rapides and State of Louisiana, have made certain new and useful Improvements in Insect-Destroyers, of which the following is a specification.

My invention is an improvement in insect-destroyers, being especially designed for destroying boll-weevils, cotton caterpillar-moths, boll worm-moths, sharp-shooters, and other insects injurious to the cotton-plant and other growing plants and which can also be used in destroying insects in gardens and orchards; and the invention consists in certain novel constructions and combinations of parts, as will be hereinafter described and claimed.

In the drawings, Figure 1 is a perspective view of an apparatus embodying my invention. Fig. 2 is a vertical cross-section thereof drawn through the oil-tank and the burners, and Fig. 3 is a detail vertical section drawn transversely through one of the burners and sulfur-troughs.

My invention is adapted for burning fuel-oil, such as the ordinary Beaumont oil, in connection with sulfur-troughs, the fumes of which will aid in destroying the insects, and while the machine may be used in the daytime it is especially adapted for use at night and is arranged to operate close to the ground, so the burners will burn all the insects they pass over, while those which fly to the light will be destroyed.

The apparatus includes a sled A, on which is mounted an elevated box or support B for the tank C, which may be adapted to hold several gallons of Beaumont oil and is provided in its top with an opening C', in which a funnel may be introduced for filling the tank whenever desired. A hood D fits over the tank C and tends to protect the same, as will be understood from Figs. 1 and 2 of the drawings.

The burner feed-pipes E communicate at their upper ends with the lower end of the tank C, are provided with regulating-valves E', which may preferably be globe valves, extend down along the opposite sides of the elevated support B, and are deflected outwardly at their lower ends and project at such ends into and support the inner ends of the burners F, which burners are perforated on their upper sides at F' to discharge the oil and are supported at their outer ends in the guard-frames G, which extend around the burners, as shown, and at their front ends protect the burners from injury by coming in contact with any obstruction as the sled moves over the ground. The rear bars of the guard G support the sulfur-troughs H, which are open and are arranged immediately in the rear of the burners F, so that the sulfur will be burned by the flames from the oil, and its fumes will aid in destroying the insects as the sled moves over the ground.

The burners and the feed-tubes E adjacent to the burners are wrapped or otherwise covered with asbestos to prevent the feed-pipes and the burners from getting too hot, the asbestos being perforated in register with the perforations in the burner-tubes F, as shown in Figs. 2 and 3.

Handles are provided at the rear end of the sled, so that the operator can readily guide the apparatus in passing over the ground, the sled being drawn by a horse or mule between rows of cotton or other plants and the burners extending beneath the branches of the plants close to the ground and operating to destroy the insects by fire and fumigation.

The wood of the sled is covered by tin or galvanized iron, as shown at I in Fig. 2, in order to protect it from burning.

At the front of the sled I support, by means of uprights J and a cross-bar J', hanging drags K, which operate in front of and in line with the opposite burners to drag over the cotton and shake the bugs off the foliage. These drags may be of gunny-sack or other suitable textile material and will operate to dislodge the insects and subject them to the action of the burners as desired.

As stated, the invention is designed for using fuel-oil, which is inexpensive and gives a dense ill-smelling smoke destructive to insect life. The burners will in practice pass within two or three inches of the ground-surface and will scorch and destroy insects which are on the earth beneath the plants.

As the machine is low down and passes between the rows, it can be run in any field regardless of the density or height of the cotton growing. The machine is simple of construction and of sufficient strength to stand the rough treatment of the ordinary Southern farm labor and when operated as described will send a flame and a dense cloud of suffocating smoke and heated air up among the leaves and branches where the cotton-insects hide. Also when the machine is kept in motion, as described, it will not injure the cotton-plants to any appreciable extent.

Having thus described my invention, what I claim as new, and desire to secure by Letters Patent, is—

1. An insect-destroyer comprising a sled, guiding-handles at the rear of the sled, a tank supported on the sled, guard-frames at the opposite sides of the sled and having a front bar to guard a burner and a rear bar, sulfur-troughs carried by the rear bars of the guard-frames, burner-tubes supported at their outer ends by the guard-frames and extending inwardly in advance of the sulfur-troughs, feed-pipes extending from the oil-tank downwardly to the burner-tubes and provided with regulating-valves and having their lower ends extending laterally and projecting into and supporting the inner ends of the burner-tubes, the asbestos covering for the burner-tubes and the feed-pipes, the hood covering the oil-tank, the cross-bars supported from the sled and the drag-cloths hanging from said cross-bars and arranged in advance of their respective burners substantially as set forth.

2. An insect-destroyer comprising a carrier, burners at the opposite sides of said carrier and arranged close to the ground, sulfur-troughs in rear of and in close proximity to the burners, an oil-tank, and feed-pipes leading from the oil-tank to the burners, substantially as set forth.

3. The combination of a carrier, a burner or burners supported thereby and arranged to operate close to the ground, a hanging cloth arranged to operate in front of and in alinement with the burner, and devices for supporting said cloth from the carrier, substantially as set forth.

4. An insect-destroyer comprising a carrier, a tank mounted thereon, burners at the opposite sides of the carrier and arranged to operate close to the ground, feed-pipes leading from the tank to the burners, and hanging cloths supported from the carrier and operating in advance of the burners, substantially as set forth.

5. The combination of the carrier, the guard-frames projecting from the opposite sides of the carrier, burners supported within the guard-frames and protected by the front side of said frames and means for supplying oil to said burners substantially as set forth.

6. The combination of the carrier, the guard-frames at the opposite sides of the carrier, the burners supported in the guard-frames, and the sulfur-troughs supported by the guard-frames and arranged in rear of and in close proximity to the burners, the oil-tank and the feed-pipes leading from the oil-tank to the burners, substantially as set forth.

7. An insect-destroyer, comprising a sled, burners supported at the opposite sides of the sled and arranged to operate close to the ground and hanging cloths supported from the sled and operating in advance of their respective burners, substantially as set forth.

LINN TANNER.

Witnesses:
  N. W. BRAND,
  S. HETHENICK.